Figure 1:
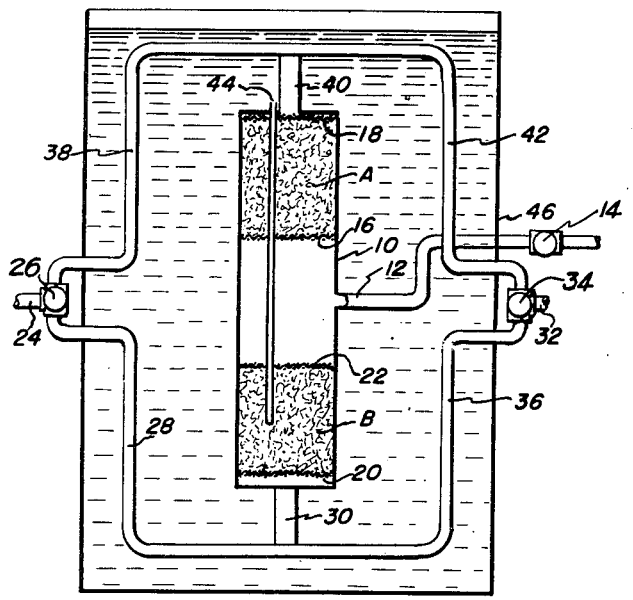

Nov. 16, 1954   J. R. PAILTHORP   2,694,739
DISPROPORTIONATION OF CHLOROFLUOROMETHANES
Filed March 7, 1952

——— TOTAL CONVERSION
------ CONVERSION AFTER PASS
THRU FIRST CATALYST BED

INVENTOR.
JOHN R. PAILTHORP
BY
Edwin E. Woodhouse
ATTORNEY.

2,694,739

DISPROPORTIONATION OF CHLOROFLUOROMETHANES

John R. Pailthorp, Wilmington Manor, Del., assignor to E. I. du Pont de Nemours & Company, Wilmington, Del., a corporation of Delaware Application March 7, 1952, Serial No. 275,340

6 Claims. (Cl. 260—653)

This invention relates to a process for the catalytic disproportionation of chlorofluoromethane and, more particularly, to the conversion of $CCl_3F$ to $CCl_2F_2$ and $CClF_3$ and the conversion of $CCl_2F_2$ to $CClF_3$.

Dichlorodifluoromethane ($CCl_2F_2$) and chlorotrifluoromethane ($CClF_3$) are valuable compounds for use as refrigerants and other purposes, and chlorotrifluoromethane is particularly valuable for low temperature refrigeration. On the other hand, trichlorofluoromethane ($CCl_3F$) is of relatively little value, but is more readily prepared and is obtained in substantial amounts in the production of dichlorodifluoromethane and chlorotrifluoromethane by the fluorination of carbon tetrachloride. Accordingly, it is highly desirable to provide a method for producing dichlorodifluoromethane and chlorotrifluoromethane from trichlorofluoromethane in high yields at low cost.

C. W. Croco, in Patent No. 1,994,035, has disclosed a method for producing $CCl_2F_2$ and $CClF_3$ from $CCl_3F$ by reaction in the liquid phase with anhydrous aluminum chloride at the boiling point of $CCl_3F$. Such process is carried out in batches and the control of the conditions is rather difficult on a large scale. The carbon tetrachloride, formed in such reaction, reacts with the aluminum chloride to form a catalytically inactive complex, whereby the amount of $CCl_3F$ which can be converted by a given amount of aluminum chloride is quite small.

W. S. Murray, in Patent No. 2,426,637, discloses a much improved process, wherein $CCl_3F$, $CCl_2F_2$, or mixtures thereof, are passed in the vapor phase through anhydrous aluminum chloride at the rate of from about 0.1 to about 2.2 pounds per pound of aluminum chloride per hour at catalyst temperatures of from about 100° C. to about 175° C. Murray employs substantially pure aluminum chloride in the form of coarse particles, but suggests that the aluminum chloride can be supported on an inert carrier, such as silica gel or alumina gel. Alumina gel is a colloidal form of partially dehydrated aluminum hydroxide. He discloses that the process is complicated by a side reaction whereby $CCl_2F_2$ reacts with the aluminum chloride to form aluminum fluoride and $CCl_4$, resulting in decrease in the activity of the catalyst and the consumption of part of the starting material to yield undesired products. He points out that such side reaction takes place preferentially at low temperatures and at high rates of feed of the chlorofluoromethane vapor. In such process, the life of the catalyst is still somewhat limited and the permissible rate of flow of the chlorofluoromethane is quite limited, thereby limiting the rate of production of the desired products and the amount which can be produced by a given apparatus.

It is an object of the present invention to provide an improved process for the disproportionation of chlorofluoromethanes and particularly for the production of more highly fluorinated methanes from $CCl_3F$ and $CCl_2F_2$. Another object is to provide such a process whereby the life of the catalyst is greatly increased. A further object is to provide such a process whereby the amount of chlorofluoromethane that is converted by a unit of catalyst is greatly increased. A still further object is to provide a process for greatly increasing the rate of production of the desired product or products. Other objects are to advance the art. Still other objects will appear hereinafter.

The above and other objects may be accomplished in accordance with my invention which comprises passing a substantially anhydrous chlorofluoromethane, consisting of carbon, chlorine and fluorine and containing 2 to 3 chlorine atoms and 1 to 2 fluorine atoms, in the vapor phase first through a bed composed of from about 5% to about 20% by weight of substantially anhydrous aluminum chloride supported on activated alumina and then through a bed originally consisting essentially of activated alumina at a rate of from about 2 to about 200 grams of such chlorofluoromethane vapor per hour per gram of aluminum chloride while maintaining a temperature from about 90° C. to about 190° C. in the first bed and a temperature of from about 80° C. to about 190° C. in the second bed, and recovering the products. In the preferred aspect of my invention, the flow of chlorofluoromethane vapor through the beds is periodically reversed whenever the activity of the catalyst in the first bed drops to less than 50%.

By such process, the life of the catalyst is very greatly increased over that of the prior processes, and much larger amounts of the chlorofluoromethanes can be converted to the desired products by a given amount of the catalyst. Also, the chlorofluoromethanes can be passed through the catalyst at very much higher rates than in the prior processes, whereby the production, per unit of catalyst and equipment over a given period of time, is greatly increased. Furthermore, the process is operable over a wider range of temperature and with far less difficulty due to competing side reactions than the prior processes.

The chlorofluoromethanes, which may be employed as starting materials, are those which consist of carbon, chlorine and fluorine and contain 2 to 3 chlorine atoms and 1 to 2 fluorine atoms, i. e. $CCl_3F$ and $CCl_2F_2$. The $CCl_3F$ can be converted to $CCl_2F_2$, $CClF_3$, or mixtures of the two, depending upon the conditions employed. The $CCl_2F_2$ will be converted to $CClF_3$. The following equations illustrate the reactions:

$$2CCl_3F \rightarrow CCl_2F_2 + CCl_4$$
$$3CCl_3F \rightarrow CClF_3 + 2CCl_4$$
$$3CCl_2F_2 \rightarrow 2CClF_3 + CCl_4$$

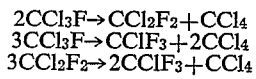

The chlorofluoromethanes must be passed through the catalyst beds in the vapor phase. Also, they should be substantially anhydrous, that is, they should not contain more than about 0.001% by weight of water so as to avoid excessive deterioration of the catalyst by hydrolysis. Preferably, the vapors will be preheated to approximately the reaction temperature in the first bed, before they are passed into the first bed.

The first catalyst bed should be composed of substantially anhydrous aluminum chloride supported on activated alumina, the aluminum chloride constituting from about 5% to about 20% by weight of the catalyst bed. Alumina is aluminum oxide, $Al_2O_3$. The alumina should be in the form of coarse particles, such as grains, lumps, pieces, etc. Alumina of from about 4 mesh to about 30 mesh size is satisfactory, but that of from about 10 mesh to about 20 mesh size is generally preferred.

The second bed will originally consist essentially of activated alumina, similar in character and size ranges to that employed in the first bed. Generally, the amount of alumina in the second bed should be equal to at least one-half the amount in the first bed. Usually, the amount of alumina in the second bed will be from about 0.5 to about 2 times the amount in the first bed and, preferably, will be about equal to the amount in the first bed, particularly when the flow of chlorofluoromethane vapor through the beds is to be periodically reversed. The second bed may be much larger than the first, the size thereof being limited solely by practical considerations, particularly when the chlorofluoromethane vapors are to be caused to flow through the beds in only one direction. Also, 2 or more beds of activated alumina may be employed in place of a single bed. In order to obtain optimum conversions of the chlorofluoromethanes in a single pass through the beds, it will be desirable to employ 2 or more beds containing aluminum chloride, each followed by a bed which originally consists essentially of activated alumina.

Under the conditions employed in the process, the aluminum chloride in the first bed is gradually sublimed and is carried along in the vapor stream to the second bed where it is adsorbed on the activated alumina. Since the reaction is somewhat exothermic, the temperature in the first bed tends to increase at the beginning of the operation and to remain higher than the temperature in the second bed until the amount of aluminum chloride in the second bed equals the amount in the first bed. Therefore, for a substantial portion of the operation, the second bed will be at a somewhat lower temperature than the first bed which favors the adsorption by the second bed of the aluminum chloride from the vapor stream. As the aluminum chloride is thus gradually sublimed from the first bed, the catalytic activity of such bed decreases, resulting in a gradual decrease in the percent conversion of the chlorofluoromethane vapors passing through the bed. Also, as the catalytic activity of the bed decreases, the temperature thereof tends to decrease. At the same time, the aluminum chloride, adsorbed by the second bed, acts to convert chlorofluoromethane vapors which are not converted by the first bed, the catalytic activity and temperature of the bed increasing with increase in the amount of aluminum chloride adsorbed thereon until it approaches or equals the maximum activity and temperature attained in the first bed. Thus, the increase in activity in the second bed largely compensates for the decrease in activity of the second bed, whereby the total conversion through the combined beds will remain high over long periods of operation, even though the catalytic activity of the first bed becomes materially decreased. Accordingly, the life of the catalyst and the amounts of chlorofluoromethane vapors that are converted to the desired products per unit of catalyst are greatly increased.

If the flow of the chlorofluoromethane vapors is sufficiently long continued in only one direction, substantially all of the aluminum chloride will be transferred from the first bed to the second bed and aluminum chloride will tend to be sublimed from the second bed and carried out of the system with the vapors to a serious extent. Such result is largely avoided by conducting the process according to my preferred mode of operation which comprises reversing the flow of chlorofluoromethane vapors through the beds whenever the catalytic activity of the first bed drops to less than 50%. More specifically, when the activity of the first catalyst bed has dropped to less than 50%, i. e. when the conversion through the bed has decreased by at least 50%, the flow of chlorofluoromethane vapors through the beds is reversed, whereupon the second bed becomes the first catalyst bed and the first bed becomes the second or adsorbing bed. Preferably, the flow of chlorofluoromethane vapors will not be reversed until the catalytic activity of the first bed has decreased to such an extent that the conversion through such bed is in the range of from about 10% to about 30% of the optimum obtained in such cycle of operation. Such reversed flow of chlorofluoromethane vapors will be continued until the activity of the catalyst in the first bed (originally the second bed) drops to less than 50%, preferably to from about 10% to about 30% of its optimum activity, whereupon the flow of chlorofluoromethane vapors through the beds is again reversed. Such periodic reversal of the flow of chlorofluoromethane vapors will be continued until the aluminum chloride is substantially exhausted or until the total conversion of the chlorofluoromethanes through the beds is decreased to where the process is no longer practical. By such periodic reversal of the flow of the chlorofluoromethane vapors through the beds, the life of the catalyst is still further greatly prolonged and the amount of desired products obtained per gram of aluminum chloride is greatly increased. It will be understood that the aluminum chloride will be slowly exhausted by side reactions, lost by unavoidable entrainment in the discharged products, or otherwise. However, such loss of total activity is far less and much slower in my process than in the prior processes.

The change in activity of the beds can be readily followed and measured by the change in temperature of the beds or by withdrawing samples of the reaction mixture from between the beds and analyzing such samples to determine the percent conversion through the first bed. Most conveniently, such change in activity can be determined by the change in temperature of the second bed. Preferably, the beds will be spaced apart so as to permit samples of the reaction mixture to be withdrawn from between them and to permit the temperatures of the beds to be measured accurately and individually.

The temperatures in the beds should be maintained above the boiling point of carbon tetrachloride so as to prevent the $CCl_4$ from condensing on the catalyst and forming inactive complexes with the aluminum chloride. Temperatures of 200° C. and above are undesirable because the aluminum chloride tends to sublime at too high a rate and to be carried out of the system without adsorption on the second bed. Accordingly, the beds should be maintained at a temperature of from 80° C. to about 190° C., and the first bed should preferably be maintained at from about 90° C. to about 190° C. The temperatures affect the rate at which equilibrium is reached. Also, with $CCl_3F$, the lower temperatures favor the formation of $CCl_2F_2$, while the higher temperatures favor the formation of $CClF_3$. The equilibrium conversion of $CCl_3F$ to $CCl_2F_2$ is 87% at both 90° C. and 180° C. The equilibrium conversion of $CCl_2F_2$ to $CClF_3$ is 93% to 96% at both 128° C. and 160° C. In the disproportionation of $CCl_3F$, the preferred range for the formation of $CCl_2F_2$ is about 90° C. to about 100° C. and for the formation of $CClF_3$ is about 170° C. to about 190° C. The preferred range for the disproportionation of $CCl_2F_2$ to $CClF_3$ is about 150° C. to about 170° C.

The amount of aluminum chloride on the alumina in the first bed may vary from 5% to about 20% by weight of the total mass of the bed. The preferred range is from about 10% to about 20% by weight. At such concentrations, the bed contains a sufficient amount of aluminum chloride to give a good reaction rate, and the quantity of aluminum chloride subliming is not objectionably large. If the amount of aluminum chloride in the bed materially exceeds 20% by weight, the quality of aluminum chloride subliming tends to become objectionably large.

The rate at which the chlorofluoromethane vapors are passed through the beds depends on the temperature in the beds. At the lower temperatures, the rate is necessarily slower than at the higher temperatures, if a thermodynamic equilibrium is to be reached. If the rate is too high, the conversion will be low, that is, the thermodynamic equilibrium will not be reached, and the amount of unreacted starting material present in the reaction products will be high. For reasonable conversions, the rate of flow may be varied from about 2 grams to about 200 grams of chlorofluoromethane vapor per hour per gram of aluminum chloride in the beds. For converting $CCl_3F$ to $CCl_2F_2$, the preferred range is from about 65 to about 85 grams of $CCl_3F$ per hour per gram of aluminum chloride. For preparing $CClF_3$, the preferred range is from about 15 grams to about 25 grams of the chlorofluoromethane vapors per hour for each gram of aluminum chloride.

The reaction will normally be carried out at substantially atmospheric pressure. Higher pressures may be used so long as they do not liquefy the carbon tetrachloride which is obtained as a by-product of the reaction.

The products may be recovered, purified and separated by methods well known to the art, particularly such as those disclosed by Murray in Patent No. 2,426,637. Unreacted starting material may be recycled to the process. Also, where $CCl_3F$ is to be converted to $CClF_3$, any $CCl_2F_2$ obtained may be recycled to complete its conversion to $CClF_3$.

Figure 2:
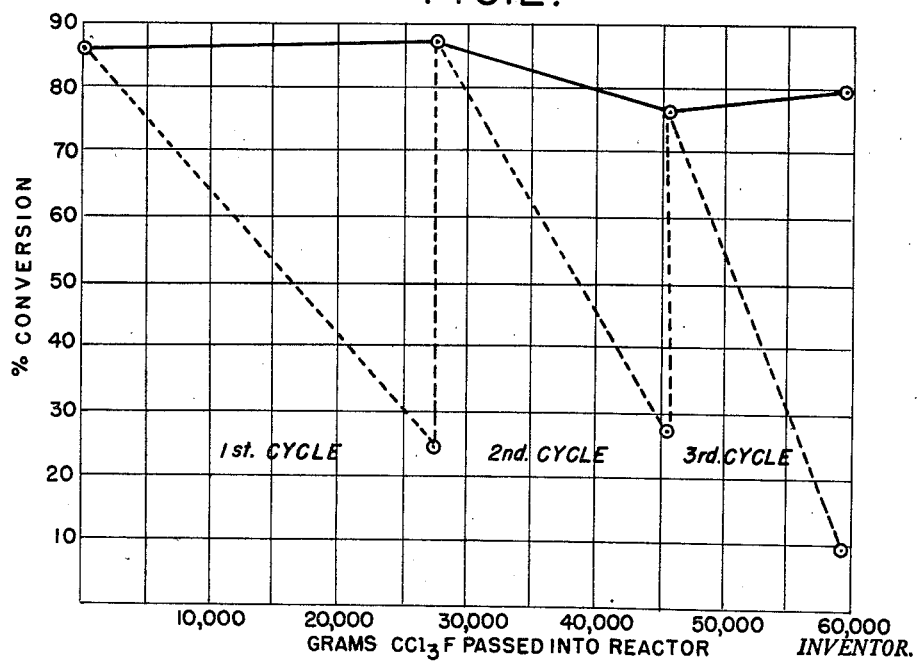

My process may be further illustrated by reference to the accompanying drawings wherein Figure 1 illustrates diagrammatically one suitable form of apparatus for carrying out my process, and Figure 2 is a diagram which illustrates the results obtained in the process and which is described in more detail in connection with Example 1.

Referring more particularly to Figure 1 of the drawings, the reactor 10 consists of a tube, which was one inch in diameter and 10 inches long, provided at its midpoint with a side sampling pipe 12 closed by a valve 14. A catalyst bed A is provided in the upper end of the reactor 10 and is supported on a screen 16 and covered by a screen 18. A similar catalyst bed B is provided at the lower end of the reactor 10 and is supported on a screen 20 and covered by a screen 22. The lower end of the reactor is connected with a supply pipe 24 for chlorofluoromethane vapors through a 3-way valve 26, and ¼ inch tubing 28 and 30, and with a product discharge pipe 32 through a 3-way valve 34 and ¼ inch tubing 36 and 30. The upper end of the reactor is also connected to the supply pipe 24 through 3-way valve 26 and ¼ inch tubing 38 and 40, and with the discharge pipe 32 through 3-way valve 34 and ¼ inch tubing 42 and 40. In practice, the tubing 28, 36, 38 and 42 is wound around the reactor 10 in a loose spiral. The reactor is also provided with a thermocouple well which passes down through catalyst bed A and into catalyst bed B. The thermocouple well 44 contains iron-constantan thermocouples to record the temperatures in the two catalyst beds. The reactor 10 and the tubing 28, 30, 36, 38, 40 and 42 are all immersed in an agitated heated oil bath in a suitable container 46.

In the equipment employed, the reactor and tubing were constructed of copper, and the screens and thermocouple well were constructed of "Inconel." However, such parts of the equipment may be constructed of other materials that are inert to the reaction products, such as glass, ceramics, nickel, "Inconel," platinum, etc. Also, other heat exchange liquids may be employed in place of the oil in the bath, such liquids being obvious to those skilled in the art.

In operation, the valve 26, which may be operated manually or automatically, is operated to connect the supply pipe 24 with the bottom of the reactor through tubing 28 and 30, while closing off tubing 38. At the same time, valve 34 is similarly operated to connect discharge pipe 32 with the top of the reactor through tubing 42 and 40, while closing off tubing 36. The bath is heated to the approximate reaction temperature whereupon the chlorofluoromethane in the vapor phase is caused to flow through supply pipe 24 and tubing 28 and 30 into the bottom of the reactor 10 and upwardly through catalyst beds B and A, where the chlorofluoromethanes are converted to desired products. The products are discharged through pipes 40, 42 and 32 to equipment, not shown, for recovering and separating the products. When most of the aluminum chloride has been transferred from bed B to bed A, that is, when the activity in bed B has decreased to less than 50%, the valves 26 and 34 are operated to cause the chlorofluoromethane vapors from supply pipe 24 to flow through tubing 38 and 40 into the top of the reactor, downwardly through beds A and B for conversion of the chlorofluoromethanes to the desired products which are discharged through tubing 30 and 36 and discharge pipe 32. When most of the aluminum chloride has been transferred from bed A to bed B, the valves 26 and 34 are again operated to cause the chlorofluoromethane vapors to flow upwardly through beds B and A as in the first cycle.

In order to more clearly illustrate my invention, preferred modes of carrying the same into effect, and the advantageous results to be obtained thereby, the following examples are given:

*Example 1*

The apparatus of Figure 1 was used. The catalyst bed B was 3 inches in depth, weighed 30 g., and consisted of 15% by weight of anhydrous aluminum chloride on 10 to 20 mesh activated alumina. The bed A was 3 inches in depth and consisted of 30 g. of 10 to 20 mesh activated alumina.

The temperature of the bath was adjusted to 75–76° C. and the flow of dried $CCl_3F$ vapor was started through the bottom of the reactor at a rate of 5 g. per minute. The temperature of the lower (first) catalyst bed leveled off at 90° C., while the upper (second) bed was at 82° C. As the activity of the lower catalyst bed decreased, it was necessary to gradually raise the bath temperature to 83° C. to maintain the catalyst bed at 90° C. After 27,300 g. of $CCl_3F$ had been passed up through the reactor, the conversion through the lower catalyst bed (as measured through the midpoint sampling line) had dropped from 85.5% to 24%, while the total conversion through both beds (by analysis of the exit gases from the reactor) was 87%. The temperature of the upper catalyst layer rose to 92° C.

The flow of $CCl_3F$ vapor was then reversed, and the upper catalyst bed (now the first bed) was held at 90° C. by lowering the bath temperature to 80° C. A sample, taken from the midpoint sampling line immediately after the reversal of flow, showed 87% conversion, and the total conversion was also 87%. After 18,600 g. of $CCl_3F$ had been passed in this downward direction, the conversion, as measured after the upper catalyst bed (through the midpoint sampling line), was 27.7%, and the total conversion through both beds (measured on the exit gas) was 76.2%. A temperature of 85° C. in the bath was necessary to maintain a temperature of 90° C. in the upper catalyst bed. The temperature of the lower catalyst bed increased to 93° C.

The flow was again reversed, and 13,670 g. of $CCl_3F$ vapor was passed up through the beds as in the beginning. At the end of this cycle, the conversion, after the lower (first) catalyst bed (sampled through the midpoint sampling line), was 9% and the total conversion through both beds was 79.4%. The bath temperature was 87° C., the lower catalyst bed was at 90° C. and the upper (second) catalyst bed was increased to 93° C.

The total yield of $CCl_2F_2$ from this run was 21,800 g. which is 98% of theory based on an average 85% overall conversion. This is a yield of 4,850 g. of $CCl_2F_2$ per g. of $AlCl_3$ in the catalyst.

The progress of the reaction is shown in Figure 2, where the percent conversion of $CCl_3F$ to $CCl_2F_2$ is plotted against the amount of $CCl_3F$ fed to the reactor. The solid line shows the total percent conversion as measured in the exit gas line from the reactor. The dotted line shows the periodic decrease in conversion through the first catalyst bed in the gas stream, and the abrupt increase in the conversion, when the gas stream is reversed, followed by a gradual decrease again until the next flow reversal to repeat the pattern.

*Example 2*

In order to further show the disproportionation of $CCl_3F$ under other conditions and the results obtainable thereby, 4.9 g. per minute of dried $CCl_3F$ was passed through a 60 g. catalyst bed composed of 10–20 mesh activated alumina containing 15% by weight of anhydrous $AlCl_3$ and then through a 30 g. bed of 10 to 20 mesh activated alumina, both in a 1 inch copper tube, at a catalyst temperature of 187° C. and a bath temperature of 148° C. A total of 153 g. of $CCl_3F$ were passed through the beds in a 6 hour period. The conversion of $CCl_3F$ averaged 92.2%, the conversion at the end of the run being 93.5%. A yield of 96% of theory of disproportioned chlorofluoromethanes was obtained, consisting of 63.3% by weight of $CClF_3$ and 36.7% of $CCl_2F_2$.

*Example 3*

In order to show the applicability of my process to the disproportionation of $CCl_2F_2$, the first cycle (before reversing the flow) was carried out with such compound. Dried $CCl_2F_2$ was passed through a 30 g. catalyst bed composed of 10 to 20 mesh activated alumina containing 15% by weight of anhydrous $AlCl_3$ and then through a 30 g. bed of 10 to 20 mesh activated alumina, both in a 1 inch copper tube, at a catalyst temperature of 162° C. and a bath temperature of 140° C. The flow of $CCl_2F_2$ varied between 1 and 2 g. per minute, it being attempted to maintain the rate of flow at about 1.56 g. per minute. At the end of 48 hours and the feed of 3,570 g. of $CCl_2F_2$, the rate of flow was 1.56 g. per minute. A total of 18,600 g. of $CCl_2F_2$ was fed through the tube over a period of 240 hours, the flow rate at the end being 1.07 g. per minute. At the end of the 240 hours, the total conversion through both beds was proceeding at a rate of 90%. A total of 16,550 g. of $CCl_2F_2$ were converted, a conversion of 89%. The product contained 9,440 g. of $CClF_3$, a yield of 99% of theory. This is a yield of 2,098 g. of $CClF_3$ per g. of $AlCl_3$ in the first cycle of the process. The yield of $CClF_3$ per g. of $AlCl_3$ can be greatly increased by continuing the process through reversing the flow of $CCl_2F_2$ as in Example 1.

It will be understood that the preceding examples have been given merely for illustrative purposes and that my invention is not limited to the specific embodiments disclosed therein. It will be apparent that the rates of flow of the chlorofluoromethane vapors, the temperatures thereof, the number and sizes of the beds, the concentrations of aluminum chloride in the beds, and the temperatures of the beds may be widely varied within the limits hereinbefore set forth in the general description without departing from the spirit or scope of my invention. Also, the character and form of the apparatus employed and the materials of which it is constructed may be very widely varied.

From the preceding description, it will be apparent that by my invention, I have provided a novel and greatly improved process for the disproportionation of chlorofluoromethanes, whereby the life of the catalyst and the yield of desired products per gram of catalyst have been very greatly increased. This results in substantial savings in the cost of the catalyst and the cost of catalyst changes, frequent changes in catalyst being expensive in terms of man-hours of labor used and production-hours lost. Also, my process permits, and preferably employs, much higher flow rates of chlorofluoromethane per unit of catalyst, resulting in greatly increased production per hour per unit of catalyst and per unit of equipment. Furthermore, my process is simple and economical to operate and to control. Therefore, it will be apparent that my invention constitutes a valuable contribution to and advance in the art.

I claim:

1. The process which comprises passing a substantially anhydrous chlorofluoromethane consisting of carbon, chlorine and fluorine and containing 2 to 3 chlorine atoms and 1 to 2 fluorine atoms in the vapor phase first through a bed composed of from about 10% to about 20% by weight of substantially anhydrous aluminum chloride supported on activated alumina and then through a bed originally consisting essentially of activated alumina at rate of from about 15 to about 85 grams of such chlorofluoromethane vapor per hour per gram of aluminum chloride while maintaining a temperature of from about 90° C. to about 190° C. in the first bed and a temperature of from 80° C. to about 190° C. in the second bed by the heat generated by the reaction plus heat from an external source applied equally to both beds, and recovering the products.

2. The process which comprises passing substantially anhydrous $CCl_3F$ in the vapor phase first through a bed composed of from about 10% to about 20% by weight of substantially anhydrous aluminum chloride supported on activated alumina and then through a bed originally consisting essentially of activated alumina at a rate of from about 15 to about 85 grams of such $CCl_3F$ vapor per hour per gram of aluminum chloride while maintaining a temperature of from about 90° C. to about 100° C. in the first bed and a temperature of from 80° C. to about 100° C. in the second bed by the heat generated by the reaction plus heat from an external source applied equally to both beds, and recovering the products.

3. The process which comprises passing substantially anhydrous $CCl_2F_2$ in the vapor phase first through a bed composed of from about 10% to about 20% by weight of substantially anhydrous aluminum chloride suported on activated alumina and then through a bed originally consisting essentially of activated alumina at a rate of from about 15 to about 25 grams of such $CCl_2F_2$ vapor per hour per gram of aluminum chloride while maintaining a temperature of from about 150° C. to about 170° C. in the beds by the heat generated by the reaction plus heat from an external source applied equally to both beds, and recovering the products.

4. The process which comprises passing a substantially anhydrous chlorofluoromethane consisting of carbon, chlorine and fluorine and containing 2 to 3 chlorine atoms and 1 to 2 fluorine atoms in the vapor phase first through a bed composed of from about 10% to about 20% by weight of substantially anhydrous aluminum chloride supported on activated alumina and then through a bed originally consisting essentially of activated alumina at a rate of from about 15 to about 85 grams of such chlorofluoromethane vapor per hour per gram of aluminum chloride while maintaining a temperature of from about 90° C. to about 190° C. in the first bed and a temperature of from 80° C. to about 190° C. in the second bed by the heat generated by the reaction plus heat from an external source applied equally to both beds, reversing the direction of flow of chlorofluoromethane vapor through the beds whenever the activity in the first bed drops to less than 50%, and recovering the products.

5. The process which comprises passing substantially anhydrous $CCl_3F$ in the vapor phase first through a bed composed of from about 10% to about 20% by weight of substantially anhydrous aluminum chloride supported on activated alumina and then through a bed originally consisting essentially of activated alumina at a rate of from about 65 to about 85 grams of such $CCl_3F$ vapor per hour per gram of aluminum chloride while maintaining a temperature of from about 90° C. to about 100° C. in the first bed and a temperature of from 80° C. to about 100° C. in the second bed by the heat generated by the reaction plus heat from an external source applied equally to both beds, reversing the direction of flow of $CCl_3F$ vapor through the beds whenever the activity in the first bed drops to less than 50%, and recovering the products.

6. The process which comprises passing a substantially anhydrous chlorofluoromethane consisting of carbon, chlorine and fluorine and containing 2 to 3 chlorine atoms and 1 to 2 fluorine atoms in the vapor phase first through a bed composed of from about 10% to about 20% by weight of substantially anhydrous aluminum chloride supported on activated alumina and then through a bed originally consisting essentially of activated alumina at a rate of from about 15 to about 85 grams of such chlorofluoromethane vapor per hour per gram of aluminum chloride while maintaining a temperature of from about 90° C. to about 190° C. in the first bed and a temperature of from 80° C. to about 190° C. in the second bed by the heat generated by the reaction plus heat from an external source applied equally to both beds, reversing the direction of flow of chlorofluoromethane vapor through the beds whenever the activity in the first bed drops to about 10% to about 30%, and recovering the products.

References Cited in the file of this patent

UNITED STATES PATENTS

| Number | Name | Date |
|--------|------|------|
| 2,313,661 | Montgomery | Mar. 9, 1943 |
| 2,324,746 | Weinrich et al. | July 20, 1943 |
| 2,426,637 | Murray | Sept. 2, 1947 |
| 2,426,638 | Murray | Sept. 2, 1947 |